United States Patent
Fields et al.

(10) Patent No.: US 6,529,674 B2
(45) Date of Patent: Mar. 4, 2003

(54) OPTICAL DEVICES EMPLOYING AN OPTICAL THRESHOLDER

(75) Inventors: Richard A. Fields, Redondo Beach, CA (US); Bruce A. Ferguson, Redondo Beach, CA (US); Mark Kintis, Manhattan Beach, CA (US); Elizabeth T. Kunkee, Manhattan Beach, CA (US); Lawrence J. Lembo, Torrance, CA (US); Stephen R. Perkins, Harbor City, CA (US); David L. Rollins, Hawthorne, CA (US); Eric L. Upton, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/998,545

(22) Filed: Nov. 29, 2001

(65) Prior Publication Data

US 2002/0034371 A1 Mar. 21, 2002

Related U.S. Application Data

(62) Division of application No. 09/444,977, filed on Nov. 22, 1999, now Pat. No. 6,327,399.

(51) Int. Cl.[7] .................................................. G02B 6/00
(52) U.S. Cl. ..................................................... 385/140
(58) Field of Search ............................ 385/24, 39, 122, 385/15, 27, 32, 140; 359/337, 245; 257/17.21, 21.22; 332/177

(56) References Cited

U.S. PATENT DOCUMENTS 3,617,779 A    11/1971  Rosenberg
4,074,361 A *  2/1978  Clow ........................... 359/107
4,088,964 A    5/1978  Clow
4,207,561 A *  6/1980  Steensma ..................... 340/531
4,934,782 A    6/1990  Soffer et al.
4,973,848 A * 11/1990  Kolobanov et al. ....... 250/458.1
5,129,058 A *  7/1992  Mifune et al. ............... 345/501
5,146,517 A    9/1992  Avramopoulos et al.
5,689,357 A   11/1997  Campi
5,793,513 A    8/1998  Fishman
6,160,352 A * 12/2000  Steinel ................. 250/214 AL
6,292,119 B1 * 9/2001  Carillo et al. ................ 341/137
6,327,399 B1 * 12/2001  Fields et al. ................... 385/19

* cited by examiner

Primary Examiner—Akm E. Ullah
(74) Attorney, Agent, or Firm—Robert W. Keller

(57) ABSTRACT

An optical device for use with an optical input beam comprising an optical thresholding device positioned along an optical path defined by the propagation direction of the optical input beam. If the combined intensity of the optical input beam and a control beam exceeds a threshold level, the optical beam passes through the thresholding device. Preferably, the optical thresholding device is a saturable absorber. When the device is configured as an optical comparator, the intensity of the optical input beam exceeds the threshold level and the thresholding device saturates and turns transparent so that the control beam passes through the thresholding device as an optical indicator beam. When the device is configured as an optical signal attenuator and the intensity of the optical input signal is negligible compared to that of the control beam, the combined intensity of the beams does not saturate the thresholding device.

9 Claims, 2 Drawing Sheets

OPTICAL DEVICES EMPLOYING AN OPTICAL THRESHOLDER

This application is a division of 09/444,977 filed on Nov. 22, 1999, now 6,327,399.

CROSS REFERENCE

This application is related to U.S. Patent Application Ser. No. 09/133,032, filed on Aug. 11, 1998, entitled "Saturable Absorber Based Optical Inverter"; U.S. patent application Ser. No. 09/343,733, filed on Jun. 30, 1999, entitled "Repetitive Absorptive Thresholding Optical Quantizer"; U.S. patent application Ser. No. 09/345,295, filed on Jun. 30, 1999, entitled "Delayed Pulse Saturable Absorber-Based Downward-Folding Optical A/D"; and U.S. patent application Ser. No. 09/133,038, filed on Aug. 11, 1998, entitled "Upward Folding Successive Approximation Optical Analog-to-Digital Converter and Method for Performing Conversion".

BACKGROUND OF THE INVENTION

1. Field of the Invention

This invention relates generally to an optical device employing an optical thresholder and, more particularly, to an optical comparator that employs an optical thresholding device positioned in a propagation path of an optical input beam that provides an indicator signal indicative of whether the intensity of the input beam is above a threshold.

2. Discussion of the Related Art

Advances in signal processing technology, including the need for greater processing speeds, increased channel bandwidths and improved transmission reliability, has resulted in a steadily growing focus on the optical domain and the vast potential that lies therein with respect to these parameters. However, optical technology, as compared to electrical and radio frequency based technology, lacks the necessary technical sophistication in many areas. Particularly, the desire for high-speed, large-bandwidth processing devices employing digital optics has been hampered by the lack of many basic optical devices and technologies readily available in the RF domain.

Optical comparators comprise an example of such a device that has not heretofore met basic design requirements. Similarly, variable optical signal attenuator is another example of a device that has not heretofore met basic attenuator design requirements. An optical comparator that compares an optical signal with an optical threshold and indicates whether the threshold has been exceeded and/or an optical signal attenuator that decreases the intensity of an optical signal by a predetermined amount with little or no reliance on RF technology would reduce system complexity and provide for high speed and large bandwidth processing advances.

What is needed is an efficient, cost effective and reliable optical comparator and variable optical signal attenuator that has application to be used in an optical signal processing system. It is therefore an object of the present invention to provide such an optical comparator and an optical signal attenuator.

SUMMARY OF THE INVENTION

In accordance with the teachings of the present invention, two optical devices are disclosed that employ an optical thresholding device positioned in the propagation path of an optical input beam.

For the optical comparator the optical thresholding device saturates and turns transparent if the intensity of the optical beam that impinges it is above a predetermined threshold level which is designed into the device. If the input beam to the optical comparator saturates the optical thresholder it outputs an indicator signal identifying the saturation and that the threshold has been exceeded. The presence of an indicator signal gives an indication of the intensity of the input beam. In one particular embodiment of the optical comparator, the optical thresholder is a saturable absorber that receives an optical control beam. If the saturable absorber saturates and turns transparent, the control beam passes through the thresholding device as an optical indicator beam. Photodetectors can be provided to convert the optical indicator beam to an electrical representation if desired. In an alternate embodiment, the optical thresholder is a semiconductor saturable absorber that is configured in a reverse-biased p-i-n layout, where the input beam generates electron/hole charge carriers in the saturable absorber that generate a current flow that can be measured as the indicator signal. When the semiconductor saturable absorber saturates, it turns transparent and the maximum number of charge carriers are generated.

For the optical signal attenuator the threshold level is varied and established by a control signal to selectively control the signal attenuation without saturating the optical thresholding device. In this embodiment, the intensity of the optical beam is less than that of the control signal.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of. the preferred embodiments directed to optical devices employing an optical thresholder is merely exemplary in nature and is in no way intended to limit the invention or its applications or uses.

Figure 1:
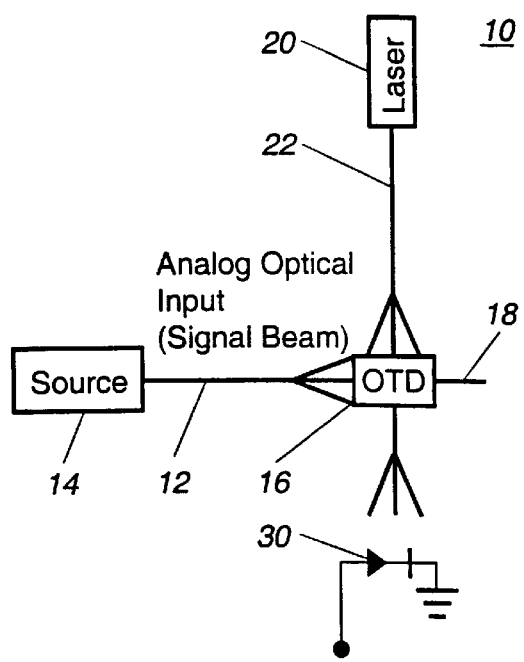
FIG. 1 is a schematic plan view of an optical comparator employing an optical threshold device, according to an embodiment of the present invention.

FIG. 1 is a schematic block diagram of an optical comparator 10, according to an embodiment of the present invention. The comparator 10 receives an analog optical input beam 12 having an intensity between a minimum value, such as zero, and some known maximum value, which is normally normalized to a value of unity, from a suitable optical source 14. In one embodiment, the input beam 12 is modulated with an analog RF signal. The modulation of the beam 12 can be by any suitable signal, both analog and digital. The output of the comparator 10 is an indicator beam that gives a representation of whether the intensity of the optical beam 12 exceeds a predetermined threshold as will be discussed below.

The comparator 10 includes a saturable absorber 16, acting as an optical thresholding device (OTD), that is positioned along the propagation path of the optical beam 12. A saturable absorber 16 is a known optical device that is generally opaque or lossy in a normal state, but when an optical beam having an intensity above a threshold level of the absorber impinges it, the absorber will saturate and become transparent or "bleached". Saturable absorbers of this type that exhibit these properties have been well known in the art for their use in mode-lock lasers. A discussion of saturable absorbers can be found in U.S. Pat. No. 5,303,256.

The absorber 16 measures the intensity of the beam 12, and if it exceeds the predetermined threshold level designed into the absorber 16, the beam 12 will pass as an optical signal output 18. Therefore, if the optical beam 12 has a large enough intensity when it impinges the absorber 16, it exceeds the threshold and passes to the output 18. If the beam 12 does not have a large enough intensity to saturate absorber 16, then it is absorbed by the absorber 16 and does not pass through. Saturable absorbers are used by way of a non-limiting example, in that any optical thresholding device having the properties described herein can be used as would be appreciated by those skilled in the art. U.S. Pat. Nos. 5,337,180 and 4,934,782 disclose other types of optical thresholding devices that may be applicable.

The comparator 10 further includes a control laser 20 that generates a laser beam 22, also referred to as a control or indicator beam. The indicator beam 22 is directed towards the absorber 16. Alternately, an optical reflector could be used to direct the indicator beam 22 into the saturable absorber 16 if the control laser is not directed toward the absorber 16. The indicator beam 22 impinges the absorber 16 from a direction relative to the propagation direction of the beam 12 so that the beam 22 does not couple with the beam 12, and obscure the signal strength of the beam 12. In this example, the indicator beam 22 and the input beam 12 are oriented at substantially 90° relative to each other at the absorber 16. Also, for efficient operation, the wavelengths of the beam 12 and the laser beam 20 should be the same or nearly the same, although that is not required for all applications. The wavelengths of the input beam 12 and the indicator beams 22 may need to be nearly the same because a saturable absorber may only operate over a certain range of wavelengths.

If the intensity of the beam 12 is large enough to saturate the absorber 16 and make it transparent, the indicator beam 22 will pass through the absorber 16 unabsorbed. If, however, the input beam 12 does not saturate the absorber 16, then the indicator beam 22 is absorbed by the absorber 16 and does not pass through. The intensity of the indicator beam 22 is not large enough to saturate the absorber 16 by itself, and in one embodiment, the intensity of the indicator beam 22 is much less than. the intensity. of the input beam 12 when it is greater than zero. So, for practical purposes, the intensity of the indicator beam 22 is negligible with respect to saturating the absorber 16. It should be recognized that if the intensity of the beam 12 is large enough to saturate an absorber 16, a small amount of light in the beam 12 is still absorbed by the absorber 16 by the saturation process.

When the indicator beam 22 passes through the absorber 16 it causes the comparator 10 to represent that the input beam 12 exceeds the threshold. Also note that the output of the comparator 10 is the modified indicator beam 22 after passing through the absorber 16, not the output signal output 18.

Figure 2:
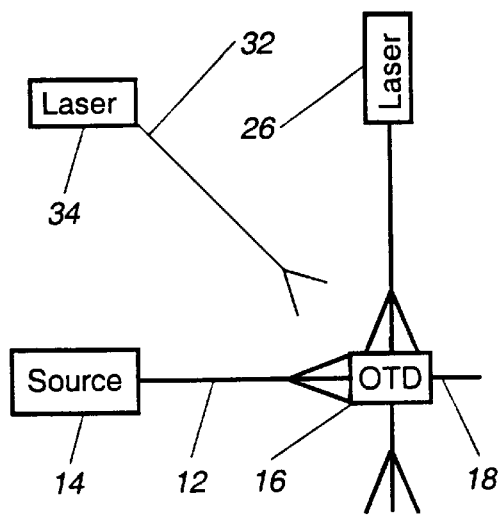
FIG. 2 is a schematic plan view of an optical comparator employing an optical threshold device, according to another embodiment of the present invention.

By carefully designing the threshold level for the absorber 16, an accurate comparison of the intensity of the beam 12 can be obtained. The threshold level can effectively, be lowered if additional optical intensity is input to the device. With reference to FIG. 2, adding a threshold control beam 32 of intensity one-half (½) of the threshold intensity effectively lowers the threshold by one-half (½). The threshold control beam 32 from a laser 34 should be introduced such that it does not couple or interfere with either the passed input beam 12 or the indicator beam 22.

The indicator beams 22 that passes through the absorber 16 can be directed to other optical devices (not shown) for optical processing in accordance with the particular application that is used in connection with the comparator 10. Alternately, the indicator beam 22 can be directed to a photodetector 30 to convert the indicator beam 22 into a corresponding electrical signal for applications requiring electrical signals.

Figure 3:
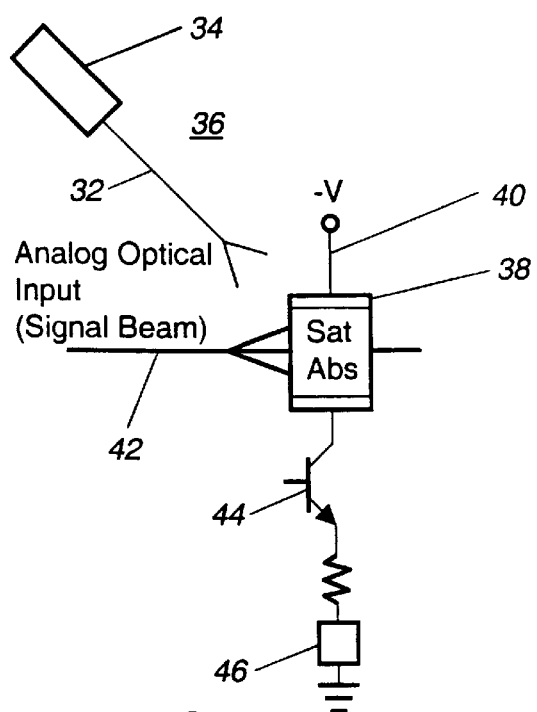
FIG. 3 is a schematic plan view of an optical comparator employing a semiconductor optical thresholder according to another embodiment of the present invention.

FIG. 3 is a schematic block diagram of a .comparator 36 that is an alternate embodiment of the comparator 10. Instead of using the generic optical threshold device 16, the comparator 36 specifically uses a semiconductor saturable absorber 38. Semiconductor saturable absorbers absorb light energy and create electron/hole charge pairs from the incident photons. The semiconductor saturable absorber 38 is configured as a reverse-biased p-i-n structure, so that the reverse bias will induce a photocurrent in the absorber 38 by this process of photo-absorption. A negative voltage potential is applied to the absorber 38 to provide the reverse bias. Once the absorber 38 generates all of the electron/hole pairs that it is capable of, it saturates and becomes transparent. When the absorber 38 saturates, it produces its maximum current flow in the reverse-bias case. Thus, the semiconductor saturable absorber can be used to produce an electrical signal proportional to the intensity of an impinging beam that it absorbs, allowing an indicator current to be produced.

As with the comparator 10 discussed above, the absorber 38 is positioned along the propagation path of an input beam 42 so that the beam 42 impinges the absorber 38. If the intensity of the beam 42 is greater than the saturation threshold level of the absorber 38, the absorber 38 will turn transparent and pass the beam 42 with some attenuation of intensity.

When the beam 42 impinges the absorber 38, electron/hole charge carriers are created and the reverse-bias applied to the absorber 38 causes the current generated by the carriers to flow to a transistor 44 connected to the n layer of the absorber 38. This creates a voltage potential on the emitter of the transistor 44 that is a measure of the current generated. A current or voltage thresholding circuit 46 is provided that measures the current from the saturable absorber 38. If the beam 42 does not impinge the absorber 38, no current is generated. The transistor 44 and the thresholding circuit 46 can be replaced by any suitable current detecting device to provide a measure of the current flow in the absorber 38, as would be appreciated by those skilled in the art. Therefore, the measure of the current flow acts in the same manner as the indicator beams 22, discussed above, to give an indication of whether the intensity of the beam 42 is greater than the threshold. The threshold level of the absorber 38 car, be designed in the manner as discussed above to provide a desired indication of the intensity of the beam 42. Also, as in the embodiment shown in FIG. 1, the threshold level can be effectively lowered by use of the laser 34 emitting the threshold control beam 32.

Figure 4:
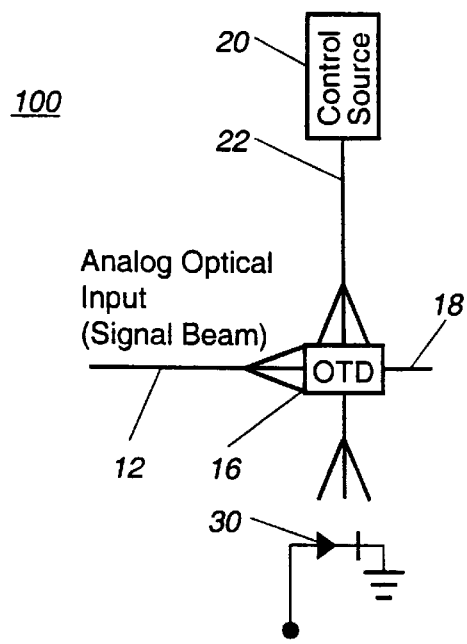
FIG. 4 is a schematic plan view of an optical signal attenuator employing an optical thresholder, according to another embodiment of the present invention.

Referring now to FIG. 4, there is illustrated; another embodiment according to the present invention. The optical signal attenuator 100 shown in this embodiment uses a control or indicator beam 22 that is significantly larger than the optical input signal 12 and serves to change the transmission characteristic of the optical tresholding device 16, but does not cause it to bleach. The changing transmissiveness of the OTD 16 causes it to correspondingly attenuate the optical input signal. Many of the elements of the optical signal attenuator 100 are identical in construction to like elements in the optical comparator 10 illustrated in FIG. 1 described above, and accordingly, there have been applied to each item of the attenuator 100 in FIG. 4 a reference numeral corresponding to the reference numeral that was applied to the like item of the optical comparator described above and shown in FIG. 1.

The fundamental difference between the optical devices of FIGS. 1 and 4 is that the optical input signal 12 of FIG. 4 is relatively small, typically about 1% of the threshold level of the OTD 16. The control source 20 generates a control beam 22 having an intensity that varies and is approximately the level of the threshold of the OTD 16. The control source 20 could either be a laser or an optical beam produced by some other optical system. Hence, the variation in the intensity of the control beam 22 serves to control the transmission of the OTD 16, but does not cause it to saturate, as will be subsequently described.

Figure 5:
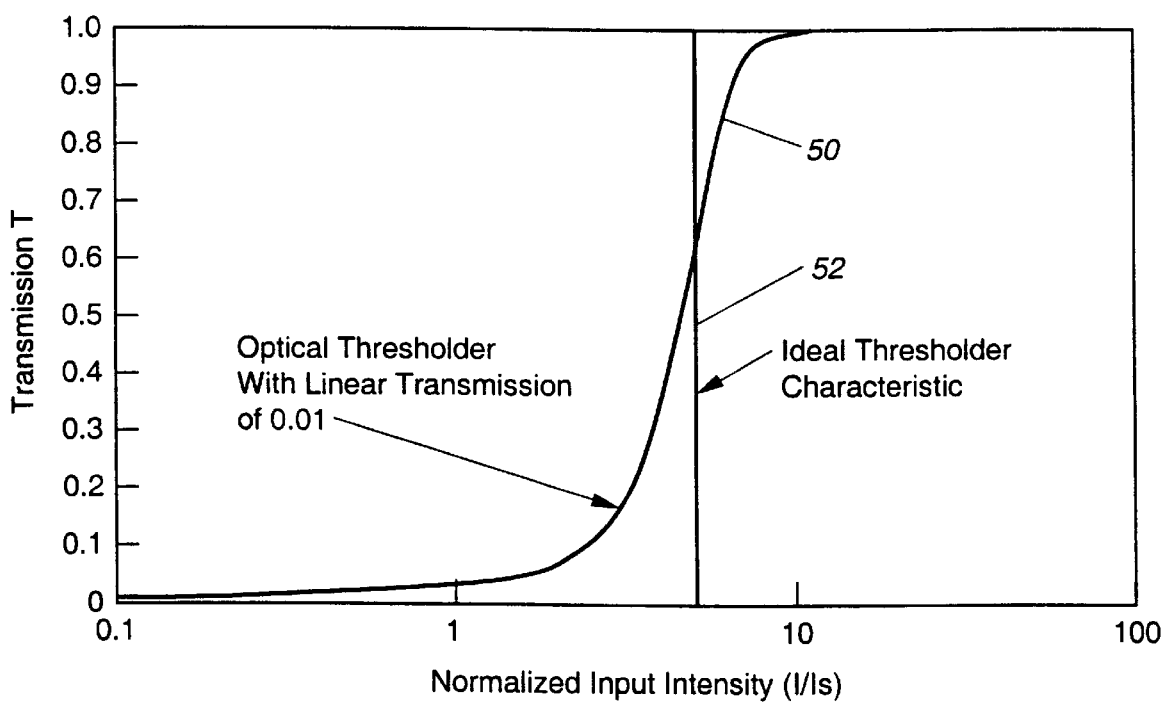
FIG. 5 is a graph of the transmission versus normalized input intensity for the optical thresholder illustrated in FIG. 3.

Also, with reference to FIG. 5, a characteristic graph 50 shows the transmission T of the saturable absorber 16 plotted as a function of the intensity of the control beam normalized to the saturation intensity of the absorber. Note that the transmission varies from 0.3<T<0.8 when the normalized input intensity is varied from approximately 3 to 7. Hence the intensity of the control beam 22 can be varied to create an OTD with the desired transmission. For example, consider the situation where the intensity of the control beam 22 is adjusted to produce T=0.5. Since the intensity of the optical input beam 12 is so small compared to the intensity of the control beam 22, it is effectively negligible to the saturation process. Thus the control beam 22 controls the amount of saturation of the OTD 16, and hence its transmission. Accordingly, the optical input signal 12 is attenuated by 0.5 by the saturable absorber 16. Should the intensity of the control beam 22 be adjusted such that T=0.3, then the optical input signal would be attenuated or reduced to provide 0.3 of its intensity at the output port 18. It is not necessary that a linear relationship exist between the control beam intensity and the saturable absorber attenuation. All that is required is a monotonic mapping.

For comparison purposes recognize that an ideal saturable absorber has a graph 52 in which the transmission curve resembles a step function that transitions from T=0 to T=1 at the threshold intensity. It should be recognized that this could not be employed in the present invention because there is not a range of intensities that could cause an incremental change in transmission of a signal through the absorber.

It should be noted that the present invention is amenable to integrating into optical devices on to a single substrate and could replace today's optical signal attenuators that are packaged in large electronic boxes.

For the comparators and attenuator discussed above, the specific frequencies of the modulating signal of the input beams are not important, except that there is a finite response time associated with the devices.

The foregoing discussion discloses and describes merely exemplary embodiments of the present invention. One skilled in the art will readily recognize from such discussion, and from the accompanying drawings and claims, that various, changes, modifications and variations can be made therein without departing from the spirit and scope of the invention as defined in the following claims.

What is claimed is:

1. An optical device for use with an optical input beam, comprising:
   an optical thresholding device having a predetermined threshold level, and being positioned along an optical path defined by the propagation direction of the optical input beam;
   means for generating a control beam through said optical thresholding device, wherein if the combined intensity of the optical input beam and the control beam is large enough to exceed the threshold level of said thresholding device, the optical beam passes through the thresholding device, said thresholding device attenuating the optical beam as it passes therethrough.

2. The device according to claim 1 wherein the control beam and the input beam impinge the optical thresholding device such that they do not interfere with each other.

3. The device according to claim 1 wherein the optical thresholding device is a saturable absorber, said optical beam and said control beam saturating the saturable absorber and making it transparent if the combined intensity of said beams is greater than the threshold level of the absorber.

4. The device according to claim 3 wherein the saturable absorber provides an optical indicator beam if the optical input beam saturates the absorber.

5. The device according to claim 1 wherein it comprises an optical comparator.

6. The device according to claim 1 wherein the intensity of said optical beam and said control beam are below the threshold level, the intensity of said control beam serving to control the transmission of said saturable absorber and hence the attenuation of the intensity of said optical beam.

7. The device according to claim 6 wherein it comprises an optical signal attenuator.

8. An optical device for use with an optical input beam, comprising:
   an optical thresholding device having a predetermined threshold level at which the thresholding device saturates and becomes transparent, the thresholding device being positioned along an optical path defined by the propagation direction of the input optical beam:
   means for generating an indicator beam of low intensity relative to that of the input optical beam, wherein the indicator beam passes through the threholding device if the total intensity of light reaching the thresholding device exceeds the predetermined threshold level; and
   means for generating a threshold control beam, also directed to the thresholding device, the threshold control beam having an intensity equal to approximately a selected fraction of the predetermined threshold level, wherein the threshold control beam effectively reduces the intensity that the input optical beam must reach to saturate the thresholding device;
   and wherein the indicator beam passes through the thresholding device if the input optical beam intensity exceeds a threshold as reduced by the threshold control beam.

9. An optical device as defined in claim 8, wherein the selected fraction of the predetermined threshold level is one half, and the indicator beam passes through the thresholding device only when the input optical beam exceeds approximately one-half of the predetermined threshold level of the thresholding device.

* * * * *